United States Patent [19]

Yasufuku et al.

[11] Patent Number: 4,764,392
[45] Date of Patent: Aug. 16, 1988

[54] MARGARINE CONTAINING FISH OIL

[75] Inventors: Kenjiro Yasufuku; Hiroshi Okafuji, both of Fuchu; Mineo Hasegawa, Hachiohji; Noriyuki Haga, Fuchu, all of Japan

[73] Assignee: Q.P. Corporation, Japan

[21] Appl. No.: 33,580

[22] Filed: Apr. 1, 1987

[51] Int. Cl.$^4$ .............................................. A23D 3/00
[52] U.S. Cl. .................................... 426/603; 260/428; 426/417
[58] Field of Search ............... 426/603, 417, 492, 601, 426/608

[56] References Cited

FOREIGN PATENT DOCUMENTS 15444 7/1978 Japan .
2033745A 5/1980 United Kingdom .

Primary Examiner—Donald E. Czaja
Assistant Examiner—Celine Callahan
Attorney, Agent, or Firm—Jordan B. Bierman

[57] ABSTRACT

A margarine containing fish oil with well-balanced nutritive qualities and no fishy odor, containing as at least a part of the liquid oil a refined fish oil produced by subjecting a mixture of a polyhydric alcohol, a monoglyceride and a fish oil to a preliminary molecular distillation to remove volatile components and deodorize the fish oil, subjecting the deodorized fish oil to further molecular distillation and recovering vaporized components as the refined fish oil.

4 Claims, No Drawings

4,764,392

MARGARINE CONTAINING FISH OIL

BACKGROUND OF THE INVENTION

This invention relates to a margarine containing fish oil using a particular refined fish oil as one of the oil materials.

Oil materials used in margarine include such solid fats and oils, which are solid at normal temperature, as hardened oils obtained by hydrogenation of animal and vegetable oils such as soybean oil and fish oil, beef tallow, lard and palm oil, and liquid oils which are liquid at normal temperature such as soybean oil, cotton seed oil, and peanut oil.

If margarine is produced from solid fats alone, the resulting margarine is too hard to be penetrated with a spoon, and has a low content of fatty acids containing double bonds, thus having a low nutritive value. Therefore, liquid oils are added as one of the oil materials to obtain an adequate softness of margarine with a balanced fatty acid composition.

For the liquid oils such as described above, vegetable oils have been predominantly used in view of the flavor of the resulting margarine.

On the other hand, fish oil contains a large amount of highly unsaturated fatty acids such as eicosapentaenoic acid (hereinafter referred to as "EPA") and docosahexaenoic acid (hereinafter referred to as "DHA"), and has been known to be effective to properly control the content of cholesterol in blood in living bodies and to prevent thrombotic disturbances, thus being suitable as a liquid oil to be used in margarine.

For such a reason, there has been proposed in Japanese Patent Publication Laying-open No. 15444/1980 a method for obtaining a margarine which has a well-balanced nutritive qualities, using a fish oil having a high content of EPA as the liquid oil. The fish oil used in the proposed method was once refined and therefore odorless immediately after the refinement, however, there was a problem that the fish oil produced fishy-odor substances with passage of time to emit fishy odor. Therefore, the proposed method has used a masking agent such as kaolin or calcium phosphate to mask the fishy odor if it is produced in the margarine. However, the produced fishy odor in the margarine has been too strong to be completely masked with the masking agent.

SUMMARY OF THE INVENTION

The present invention is to provide a margarine containing fish oil, free of fishy odor and with well-balanced nutritive qualities, produced using a refined fish oil, as one of the oil materials, which does not generate fishy-odor substances with passage of time after production.

Specifically, the margarine containing fish oil according to the present invention is characterized by the use of a refined fish oil, as a liquid oil material, which is almost free of fishy-odor substances and precursors thereof such as amines and ketones.

DETAILED DESCRIPTION OF THE INVENTION

The margarine containing fish oil according to the present invention uses a refined fish oil produced by a process in which a mixture of a polyhydric alcohol, a monoglyceride and a fish oil is subjected to a preliminary molecular distillation to remove volatile components and deodorize the fish oil, and the deodorized fish oil is subjected to further molecular distillation to recover the vaporized constituents as the refined fish oil.

The term "margarine" in the present invention means a margarine, or a so-called artificial butter, which is produced by a conventional method known in the art, using solid fats such as hardened oil and the like and liquid oils such as fish oil and the like, as the oil materials.

The refined fish oil used in the present invention is almost free of fishy-odor components and precursors thereof. The quality of the refined fish oil can be conventionally checked as follows. The refined fish oil sample is added with an antioxidant such as tocopherol or the like, kept in a sealed bottle at room temperature for over 10 days, and then checked for fishy odor. When the result is almost free of fishy odor, that refined fish oil can be used as a material for the margarine according to the present invention.

Although a crude fish oil can be treated by a conventional method (deacidification, decoloration, deodorization, and dewaxing) to obtain a refined oil with fishy-odor components removed, it is still impossible to completely remove amines and/or ketones, the precursors of the odorous substances.

An example of the production method for the refined fish oil to be used in the present invention will now be described.

A mixture of a polyhydric alcohol, a monoglyceride and a crude fish was subjected to a preliminary molecular distillation to remove volatile components and deodorize the fish oil. The deodorized fish oil was then subjected to a three-stage molecular distillation in which the deodorized fish oil was subjected to a first distillation at a film temperature of 100°-260° C. and under a vacuum of 5-30 mm Torr, the residue obtained from the first distillation was subjected to a second distillation at a film temperature of 150°-300° C. and under a vacuum of 0.1-50 mm Torr, and the residue obtained from the second distillation was subjected to a third distillation at a film temperature of 200°-300° C. and under a vacuum of 0.1-30 mm Torr.

Further, an example of the preferred production procedure for the refined fish oil to be used in the present invention will be specifically described. 100 parts by weight of a crude fish oil were added to 5 parts by weight of a polyhydric alcohol such as glycerol and 5 parts by weight of a monoglyceride such as monooleyl glyceride, and the mixture was heated at 50° C. under agitation to obtain a mixed oil. The mixed oil thus obtained was continuously charged into a falling-film type vacuum deodorization apparatus having a vaporization area of 2 m² heated with a heating medium, and deodorization was performed under the conditions of a charging oil temperature of 70°-80° C., a degree of vacuum of 30-50 mm Torr, a film temperature of 130°-150° C., and a charging rate of 210 kg/hr/m², thereby obtaining a deodorized oil.

Subsequently, a first distillation was carried out by charging the deodorized oil continuously into a high-vacuum falling-film type distillation apparatus heated with a heating medium, having a vaporization area of 2 m², under the distillation conditions of a charging oil temperature of 150°-170° C., a degree of vacuum of 7-10 mm Torr, a film temperature of 220°-230° C., and a charging rate of 110 kg/hr/m², thereby obtaining a remnant oil. Then the remnant oil was continuously charged into a heating type centrifugal molecular distillation apparatus, having a vaporization area of 1 m², and a second distillation was performed under the distillation conditions of a charging oil temperature of 170°–180° C., a degree of vacuum of 3–5 mm Torr, and a charging rate of 50 kg/hr/m², thereby obtaining a remnant oil. The thus obtained remnant oil was further charged into a centrifugal molecular distillation apparatus heated with a heating medium, having a vaporization area of 1 m², and a third distillation was performed under the distillation conditions of a charging temperature of 200°–210° C., a degree of vacuum of 3–5 mm Torr, a film temperature of 280°–290° C., and a charging rate of 30 kg/hr/m², and the vaporized substances were collected to obtain a refined oil. The resulting refined fish oil was admixed with an antioxidant to prevent oxidation, and placed in a sealed container to be used as a material for the margarine according to the present invention.

By the above described procedure, a refined fish oil which is almost free of fishy-odor components and the precursors thereof (amines and ketones) is obtained. When sardine oil was used as a material oil for the above described procedure, the resulting refined fish oil contained 10–40% of EPA and 5–20% of DHA.

The margarine containing fish oil according to the present invention is obtained using the oil materials including the above described refined fish oil, added as needed with liquid oils which are liquid at room temperature such as soybean oil, cotton seed oil and peanut oil, solid fats such as hardened oil, beef tallow, lard, and palm oil, and if necessary an oil-soluble flavor and/or an oil-soluble colorant, and aqueous materials based on an emulsifier such as defatted milk powder or casein, with condiments such as sodium chloride as needed, dissolved in fresh water; all the materials are emulsified and solidified to obtain the margarine.

The refined fish oil, as one of the oil materials, is used in amounts of 2–40%, preferably 5–15%, to the total materials. If the amount of the refined fish oil used is too small, the content of highly unsaturated fatty acids such as EPA and DHA is reduced, and the significance of balancing the fatty acid composition of the margarine using the fish oil is decreased. On the other hand, if the amount of the refined fish oil used is too large, the resulting margarine has a fishy flavor and taste, which is not always preferable, even though the refined fish oil used does not contain the fishy-odor components and the precursors thereof.

A typical production method for the margarine containing fish oil according to the present invention will now be described. A solid fat such as hardened oil is melted by heating with stirring, which is then mixed with a liquid oil (refined fish oil or a mixture of refined fish oil and vegetable oils), with an oil-soluble flavor and/or oil-soluble colorant as needed, to obtain an oil material. To obtain the margarine containing fish oil with an adequate hardness (not too hard or soft), the solid fat is used in an amount of 0.5–2.0 parts by weight, preferably 1.0–1.8 parts by weight, to one part by weight of the liquid oil.

Then, separately from the above described oil material, an emulsifier such as defatted milk powder or casein, with a condiment such as sodium chloride as needed, is dissolved in fresh water to obtain an aqueous material. The emulsifier is added in an amount of 0.1–2.0% by weight, preferably 0.5–1.0% by weight, to fresh water.

The oil material is held at a temperature of 50°–70° C. with stirring in a mixer, and the aqueous material is added in an amount of 0.1–0.4 part by weight, preferably 0.2–0.3 part by weight, to one part of the oil material, to obtain an emulsion.

Finally, the emulsion is placed in a cooling apparatus at below 10° C., preferably at 4°–5° C., for solidification to obtain the margarine containing fish oil.

As described above, with the present invention, a large amount of refined fish oil as an oil material can be contained to provide a margarine containing a large amount of highly unsaturated fatty acids, with good taste, because it is free of fishy odor.

PRODUCTION EXAMPLE 1

3.8 kg of a hardened oil, obtained by hydrogenation of soybean oil, and 5.2 kg of palm oil (solid oil) were placed in a double-walled vessel and melted by heating under agitation.

After melting, agitation was continued, and 8.2 kg of a liquid oil (a mixture of 4.2 kg of refined fish oil and 4.0 kg of rapeseed salad oil), 200 g of a monoglyceride, 10 g of butter flavor and a small amount of β-carotene were added to obtain 17 kg of an oil material.

Separately from the oil material, 2 kg of fresh water were heated at 60° C., and 700 g of defatted milk powder and 300 g of sodium chloride were dissolved in the water to obtain 3 kg of an aqueous material.

Then, 17 kg of the oil material was placed in a mixer, which was kept at 60° C. under agitation, and 3 kg of the aqueous material were added to obtain an emulsion.

The emulsion thus obtained was cooled and solidified in a cooling apparatus, thereby obtaining 19.5 kg of a margarine containing fish oil.

PRODUCTION EXAMPLE 2

In the production example 1, 4.2 kg of palm oil, and only 4.2 kg of the refined fish oil as the liquid oil were used (no rapeseed salad oil used), with other components and the procedure same as used in production example 1, to obtain 14.5 kg of a margarine containing fish oil.

TEST EXAMPLE

Using the same procedure as used in production example 1, except for the type and amount of the refined fish oil, test samples of margarine containing fish oil were prepared using the refined fish oil obtained by the above described method in amounts of 2%, 5%, 10%, 20%, 40%, and 45%, respectively, to the total amount of materials, and control samples using a commercial refined fish oil (deacidified, decolored, and deodorized) in place of the refined fish oil in the same amounts as used in the test samples. The margarine samples were tasted for evaluation. The results are shown in Table 1.

TABLE 1

| Fish oil content in margarine | | Completely free of fishy odor | Slight fishy odor | Substantial fishy odor |
|---|---|---|---|---|
| Test samples | 2% | 18 | 0 | 0 |
| | 5 | 18 | 0 | 0 |
| | 10 | 18 | 0 | 0 |
| | 20 | 17 | 1 | 0 |
| | 40 | 8 | 10 | 0 |
| | 45 | 6 | 12 | 0 |
| Control samples | 2% | 2 | 16 | 0 |
| | 5 | 2 | 10 | 6 |
| | 10 | 0 | 10 | 8 |

TABLE 1-continued

| Fish oil content in margarine | Completely free of fishy odor | Slight fishy odor | Substantial fishy odor |
| --- | --- | --- | --- |
| 20 | 0 | 3 | 15 |
| 40 | 0 | 0 | 18 |
| 45 | 0 | 0 | 18 |

Note: The above table shows the distribution of a panel of 18 experienced persons.

We claim:

1. A good tasting margarine with a high content of highly unsaturated fatty acids comprising a refined fish oil produced by subjecting a mixture of a polyhydric alcohol, a monoglyceride and a fish oil to a preliminary molecular distillation to remove volatile components and deodorize the fish oil, and recovering vaporized components as said refined fish oil; wherein the deodorized fish oil is subjected to a three-stage molecular distillation in which the deodorized fish oil is subjected to a first distillation at a film temperature of 100°–260° C. and under a vacuum of 5–30 mm Torr, the residue obtained from said first distillation is subjected to a second distillation at a film temperature of 150°–300° C., and under a vacuum of 0.1–50 mm Torr, and the residue obtained from the second distillation is subjected to a third distillation at a film temperature of 200°–300° C. and under a vacuum of 0.1–30 mm Torr.

2. A margarine containing fish oil as claimed in claim 1, wherein said refined fish oil is used in an amount of 2–40% of the total amount of the mmargarine.

3. A margarine containing fish oil as claimed in claim 1, wherein an oil material comprising a liquid oil containing said refined fish oil and a solid oil is added with an aqueous material containing water, an emulsifier and a condiment, and the mixture is emulsified and solidified; wherein said oil material and aqueous material are used in ratios of one part by weight of said oil material to 0.1–0.5 part by weight of said aqueous material.

4. A margarine containing fish oil as claimed in claim 3, wherein said refined fish oil is used in an amount of 2–40% by weight of the total amount of the materials.

* * * * *